United States Patent [19]

Savaria

[11] Patent Number: 5,572,823
[45] Date of Patent: Nov. 12, 1996

[54] HAND HELD DECOY AND HUNTER SHIELD

[76] Inventor: James R. Savaria, P.O. Box 751, Hailey, Id. 83333

[21] Appl. No.: 407,336
[22] Filed: Mar. 20, 1995
[51] Int. Cl.⁶ .................................................. H01M 31/06
[52] U.S. Cl. ........................................................ 43/2; 43/1
[58] Field of Search ........................ 43/1, 2, 3; D22/199; 2/206; D21/5, 157, 160, 190; D11/162; 135/901

[56] References Cited

U.S. PATENT DOCUMENTS 2,746,196   5/1956   Karr ................................................. 43/3
3,052,054   9/1962   Littleton et al. ................................ 43/1
5,293,709   3/1994   Cripe ............................................... 43/3

FOREIGN PATENT DOCUMENTS 492511   9/1938   United Kingdom .......................... 43/2

Primary Examiner—P. Austin Bradley
Assistant Examiner—Jeanne M. Elpel
Attorney, Agent, or Firm—Joseph H. Roediger

[57] ABSTRACT

A hand held decoy and hunter shield wherein an oversize colored silhouette of a game fowl is provided with a central viewing opening covered with a screen having the coloration of the adjacent parts of the silhouette. A handle is connected to the silhouette to permit the hunter to view the surrounding area through the shield while minimizing his exposure to game fowl in the field of view.

10 Claims, 1 Drawing Sheet

HAND HELD DECOY AND HUNTER SHIELD

BACKGROUND OF THE INVENTION

This invention relates to a hand-held decoy and hunter shield for use in observing game fowl in a natural environment with a reduced likelihood of detection.

The sport of hunting game fowl such as geese and ducks has challenged many people over the years. Participants in the sport have adopted a number of techniques and utilized a variety of mechanical devices to both lure the fowl into close proximity and to shield themselves from view. In the past, a number of different types of enclosures have been proposed but because of their size, complexity and weight complete or full enclosures have not gained widespread acceptance. Examples of the full enclosure blind can be found in U.S. Pat. Nos. 4,829,694 4,581,837 and 5,075,999.

While the use of a full concealment blind which accommodates the hunter or photographer provides the general shape and coloring needed for enticing a geese and other large game fowl to the location, the artificial blind tends to restrict the field of view of the observer. In addition, the full enclosure is difficult to transport from place to place as well as being relatively expensive.

Due to the above-mentioned problems with the full concealment blind, the use of individual decoys has been favored. The decoys are placed in the area in which the landing of the game fowl is anticipated. Prior to the placement of the decoys, the observer normally creates a blind of natural material to conceal his presence. In the case of geese, the observer typically digs a hole and covers it with natural foliage for concealment. The geese see the decoys but the observer is screened from view. Thus, the geese believe that other fowl are already present in the area and they then feel comfortable in landing. In order to take a photograph or attempt a shot, the observer must be alert and watchful to judge the precise moment at which he should exit the blind to execute his planned action. The nature of the full concealment blind often requires the observer to spend a considerable period of time in all awkward position with a restricted field of view. In addition to the lack of comfort, the restricted viewing opportunities frequently result in missed opportunities due to lack of knowledge of what is taking place in the surrounding region.

Accordingly, the present invention is directed to the provision of a versatile combination decoy and concealment shield that permits the entire surrounding region to be viewed. The invention is relatively lightweight and can be hand-held to enable the observer to manipulate it as desired. Accommodation for wind resistance is provided to render the invention usable in moderate winds. Also, provision is made for placement of the device in the ground followed by complete or partial rotation if desired.

SUMMARY OF THE INVENTION

The present invention is concerned with the provision of a game fowl decoy and movable shield which includes a planar member contoured in the form of a game fowl. The planar member is provided with the coloration of the particular game fowl of interest, typically a goose, and is made two to three times the size of the game fowl.

An elongated shaft is attached to the planar silhouette. The shaft is provided with a tapered end for insertion into the ground. A hand grip is located on the shaft to permit the user to elevate and rotate the decoy as conditions require. A viewing screen is mounted in an opening provided in the planar silhouette. The screen permits the user to observe the region in front of him while the silhouette is used to shield the observer.

The placement of the oversize silhouette in front of the observer, normally by using the handgrip to elevate the device above ground level, permits the viewer to be shielded while allowing the area of interest to be scanned throughout the viewing screen. The screen is colored in accordance with the pattern of coloration on the silhouette. As a result, the screen does not appear as a discontinuity in the coloration pattern. To aid in effectiveness, the planar silhouette is provided with the identical coloration pattern on each side.

The combination decoy and shield is effective for seated observer when the shaft is inserted into the ground as well as when the observer is standing and elevates the silhouette by using the handgrip. Normally, the observer is standing in an area of tall grasses so that the lower portion of his body is obscured by the surrounding environment thereby enabling the entire body of the observer to be shielded from view by approaching game fowl.

The silhouette is formed as a planar member to reduce both weight wind resistance to winds having a significant component of force parallel to the surface of the planar member. The viewing screen is centrally located in the planar member to relieve the pressure exerted by the component of wind force perpendicular to the planar silhouette. As a result, the device is capable of being used effectively in both the elevated and ground positions under moderate wind conditions. The reduction of the effects of winds is further enhanced by the vertical alignment of the shaft with the center of mass of the planar member.

Further features and advantages of the invention will become more readily apparent from the following detailed description of a preferred embodiment thereof when taken in conjunction with the accompanying drawings.

DESCRIPTION OF THE PREFERRED EMBODIMENT

Figure 1:
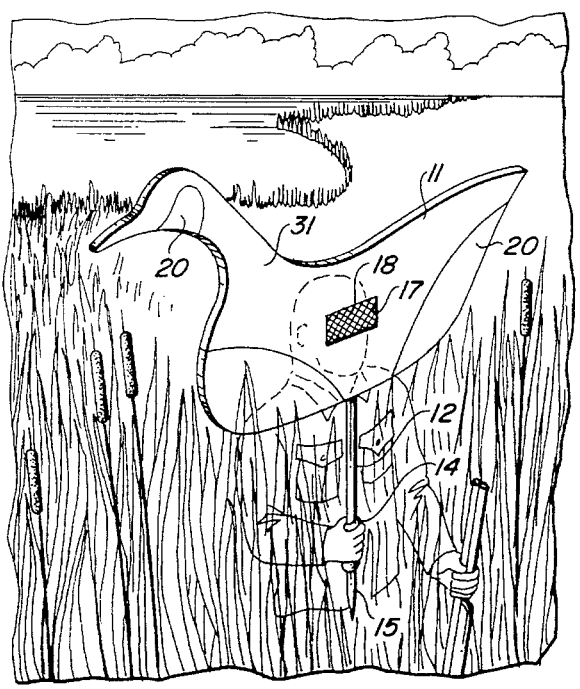
FIG. 1 if a view in perspective showing a preferred embodiment of the invention in an elevated position.

Referring now to FIG. 1, a preferred embodiment of the hand held decoy and hunter shield device is shown in elevated position in a typical environment for observing and hunting geese. The hunter is in a marsh area with chest-high vegetation and an expanse of water to the rear. As shown, the observer is facing in the direction from which the geese are expected to come. The native vegetation in combination with the present invention prevents approaching geese from viewing the observer.

Figure 2:
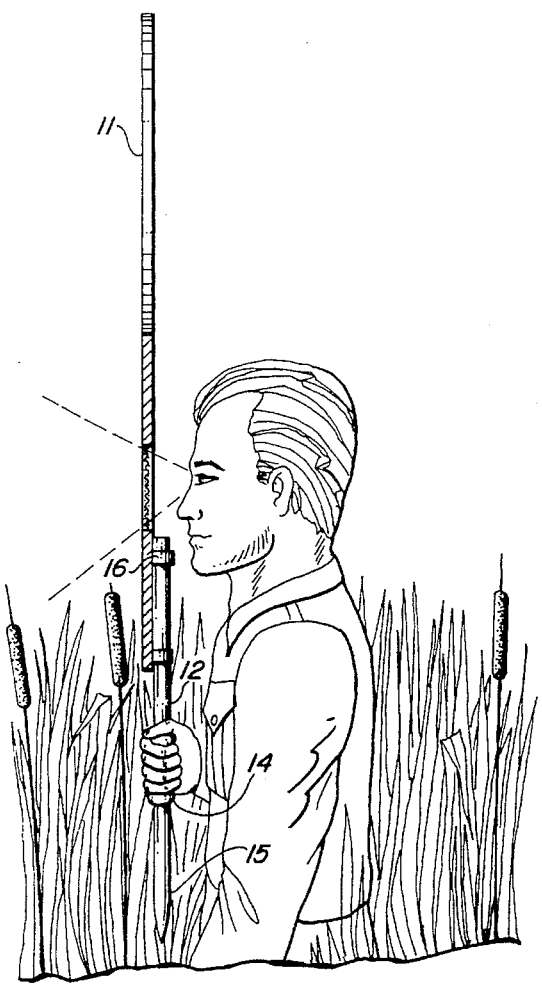
FIG. 2 is a side view of the embodiment of FIG. 1.
Figure 3:
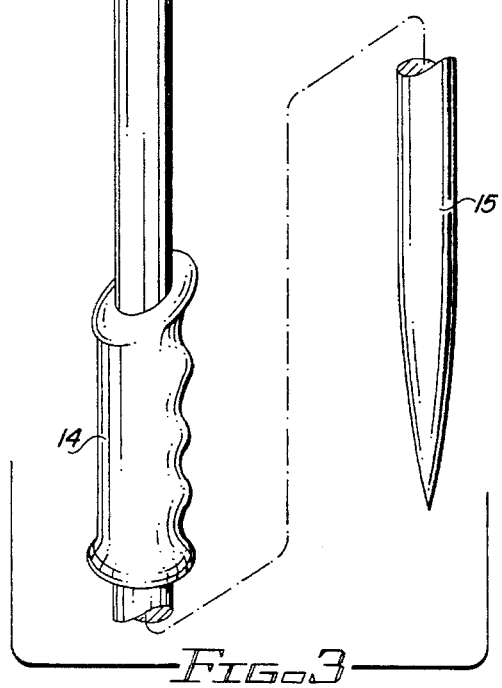
FIG. 3 is a partial view of the shaft of the embodiment of FIG. 1.
Figure 4:
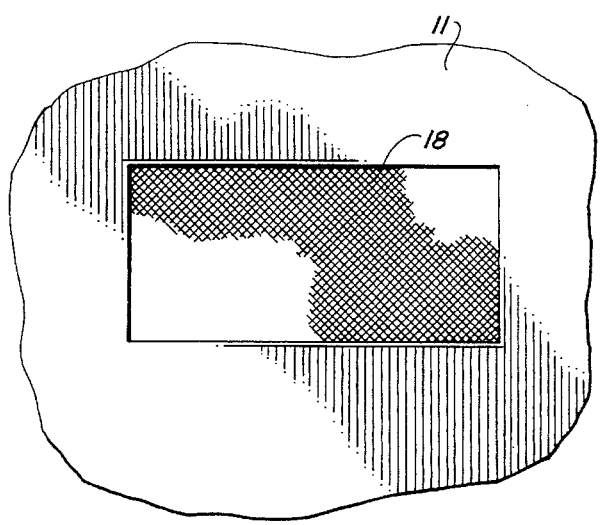
FIG. 4 is a partial plan view showing the viewing screen of the embodiment of FIG. 1.

In the embodiment shown in FIGS. 1 and 2, planar silhouette 11 is supported on elongated shaft 12. The silhouette is elevated by the observer grasping hand grip 14. The planar silhouette is contoured in the broad outline of a goose and is made oversize by a factor of two to three times. Studies have been reported that state geese are sensitive to the outline of sighted objects but insensitive to proportions.

The present decoy and shield takes advantage of this characteristic to accomplish both functions. In addition, the planar silhouette 11 is provided with the pattern of coloration typical of the type of fowl is to be observed. The embodiment shown is provided with a darkened body region 31 and distinctive white regions 20. Both the contour and the coloration of the embodiment shown are typical of geese.

The observer elevates the device by use of handgrip 14 which is formed of a flexible plastic with a series ridges to receive the fingers. The device is elevated until the centrally-located viewing screen 18 is in general alignment with the eye level of the observer as shown in FIG. 2. The viewing screen is formed of a plastic mesh having a darkened coloration so as to blend with the adjacent portions of the body 31 when viewed from a distance. The opening 17 in the planar silhouette 11 is rectangular with the long dimension being oriented to increase the side to side viewing angle of the observer. Since the position of the shield can be readily varied by the observer, the full field of view is available to the riser.

The shaft 12 is provided with a spike or tapered end 15 to permit insertion into the ground and thus shield an observer in the seated or prone positions. The shaft 12 is preferably made from aluminum tube stock to reduce the overall weight of the device. The handgrip 14 is normally formed of a molded flexible plastic which is urged into position on the shaft. Alternatively, a rigid plastic shaft having a integral hand-grip and a tapered end can be utilized if desired. The planar silhouette is fabricated from relatively thin plywood or plastic to limit the overall weight of the device while maintaining the needed rigidity for use during moderate wind conditions. The shaft is affixed to the silhouette by clamps 16 vertically positioned as show in FIG. 2. The viewing screen is affixed to the adjacent regions of the silhouette by strips tacked to the silhouette or may be fastened by adhesive applied to overlapping edges of the screen. To provide balance to the device and maintain ease of handling, the shaft is positioned to be in vertical alignment with the center of mass of the planar number. This alignment reduces the need for the application of force to maintain the device in an upright position.

During normal use, the viewing screen appears from a distance as part of the body of the silhouette and has been found not to reduce the effectiveness of the device as a decoy or a shield. In addition, the viewing screen reduces wind resistance and the overall weight of the device. The rectangular shape for the centrally-located opening for the screen enables the observer to scan the region moving moving the device and increasing its effectiveness as a decoy. The dimensions of the opening can be varied, however the structural integrity of the silhouette may be comprised if any region surrounding the opening is so narrow as to render the silhouette fragile.

While the above description has referred to a specific embodiment of the invention, it is recognized that variation and modifications may be made therein without departing from the scope of the invention as claimed.

What is claimed is:

1. A decoy for game fowl which comprises:
    a. a planar member contoured in the form of the silhouette of a game fowl, said member having a body portion which includes an opening therein;
    b. a viewing screen mounted in the opening in said planar member, said screen permitting a viewer in proximity to the screen to view the surrounding area there through;
    c. an elongated shaft attached to the planar member and having a free end, and
    d. a hand grip located on the shaft to permit an observer to position the decoy as a shield while permitting viewing of the surrounding area.

2. The invention in accordance with claim 1 wherein said planar member is contoured in the form of an oversize silhouette of said game fowl.

3. The invention in accordance with claim 2 wherein the opening in the planar member is centrally located therein.

4. The invention in accordance with claim 3 wherein said opening is rectangular with an elongated width to increase the field of view.

5. The invention in accordance with claim 4 wherein the view screen is colored in accordance with the coloration of the adjacent portion of the planar member.

6. The invention in accordance with claim 5 wherein the shaft is in vertical alignment with the center of mass of the planar member.

7. The invention in accordance with claim 6 wherein the hand grip is comprised of a plastic material formed to receive the fingers of a hand.

8. The invention in accordance with claim 3 wherein said planar member is colored in accordance with the coloration of said game fowl.

9. The invention in accordance with claim 8 wherein the shaft is attached to the planar member beneath the opening therein.

10. The invention in accordance with claim 9 wherein the free end of the shaft is pointed for placement in the ground.

* * * * *